O. W. Stanford,
Mill Stone Dress,
Nº 22,588, Patented Jan. 11, 1859.
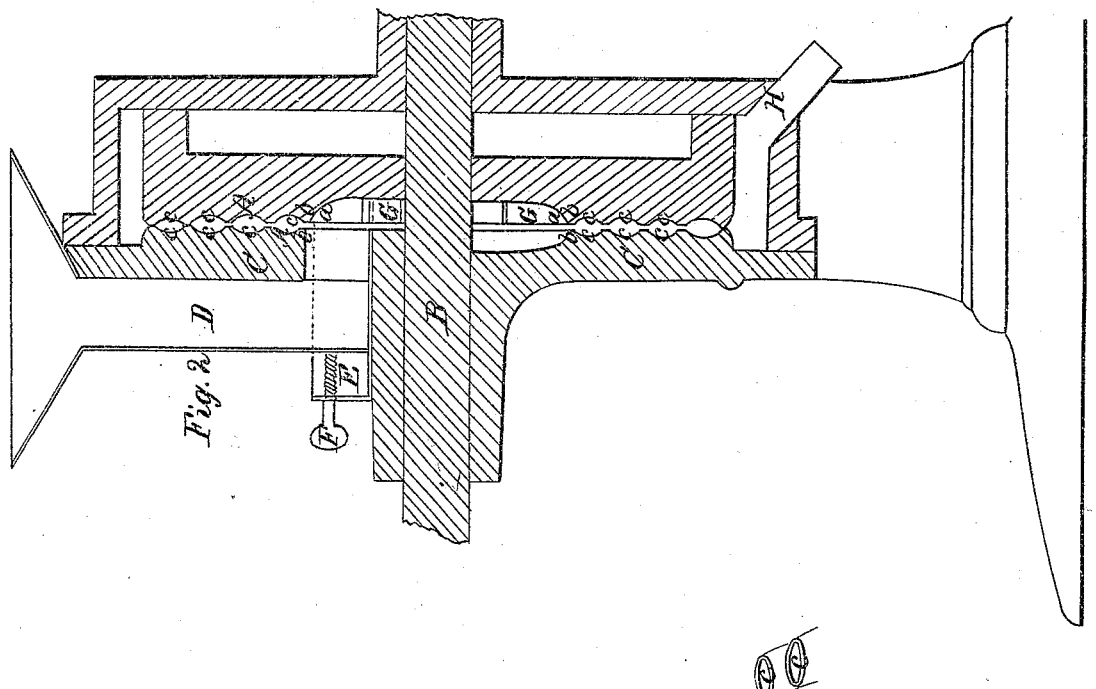
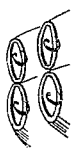
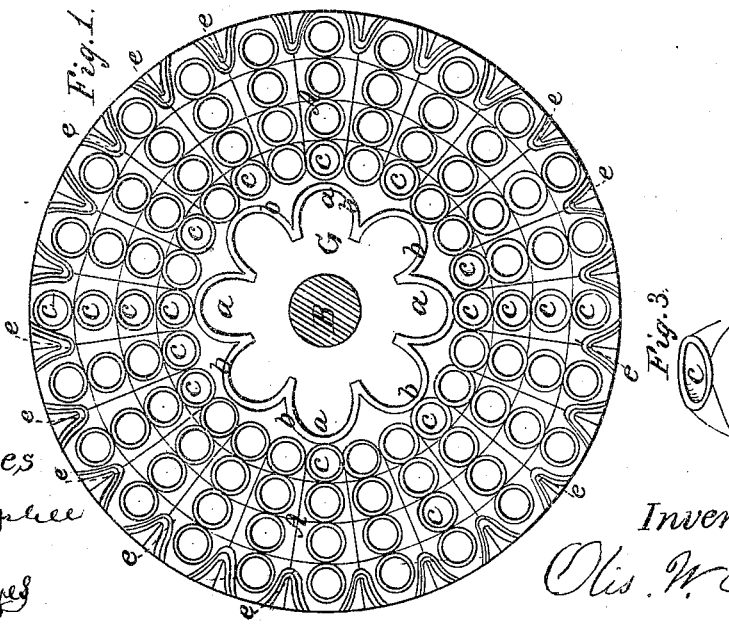
Witnesses
R. I. Campbell
Melvin Noyes
Inventor
Otis. W. Stanford

UNITED STATES PATENT OFFICE.

OTIS W. STANFORD, OF CINCINNATI, OHIO.

GRINDING-SURFACE FOR MILLS.

Specification of Letters Patent No. 22,588, dated January 11, 1859.

*To all whom it may concern:*

Be it known that I, OTIS W. STANFORD, of Cincinnati, in the county of Hamilton and State of Ohio, have invented a new and useful Improvement in Grinding-Surfaces for Mills; and I do hereby declare that the following is a full, clear, and exact description of the construction and operation of the same, reference being had to the accompanying drawings, making a part of this specification, in which—

Figure 1 represents a disk and shows the configuration of its surface. Fig. 2 shows a transverse section of the mill when put together. Fig. 3 exhibits an enlarged view of a tooth detached from the disk.

My invention consists in giving a peculiar grinding surface to the face of mill disks, or mill stones, whereby I effect the grinding of grain, etc., with a much greater facility than has been done, heretofore; and discharge the same with a regularity and facility, that the grain is not ground with that unevenness common to most mills heretofore adopted; besides, from the peculiar construction of this surface, the disks can be cast from the mold, requiring very little finish; and also, can be cast with great facility, and chilled in the casting. When it is desired to give stone this surface, it is easily " picked " into the required configuration and forms a superior dress to any heretofore adopted.

By reference to the figures above described, A represents the face of the disk, (both of these disks being alike in their surface, it is only necessary to refer to one) which is revolved by the spindle B, passing through the stationary disk C, and on which is placed a pulley wheel (not shown in the drawings), for giving motion to the disk A.

D is a hopper for carrying the grain to the center of the disks. This hopper D is fixed to the outside of disk C; and under it is an adjustable conveyer E, made adjustable by the set screw F. This is for regulating the flow of the grain to the center of the disks. When the grain passes from the mouth of the conveyer, it is received into a foliated cavity G formed in each disk. These cavities are concave, and surrounded by crescent shaped discharges $a$ $a$, eight or more in number, as the case may be. The grain when it passes over the surfaces $b$, $b$, of the discharges $a$, receives its first grinding. It is then thrown into the concavities, and ground, by coming in contact with the circular surfaces of the concavities $c$ $c$. The grain is, by means of the peculiar shape of these teeth or circular portions, (or they may be elliptical) ground and carried over a large grinding surface as it tends toward the periphery or discharge of the disks; and as these circular surfaces pass each other they tend to equally distribute the grain throughout the whole system of teeth. When the grain has been sufficiently pulverized and reduced, the operation of " flouring " is effected with great speed and facility, and at this point it is exposed to a greater surface than during its first stage, by the arrangement of Y-shaped surfaces $e$ $e$ $e$ $e$. When the flouring is equally effected the flour passes out through the channels formed by the Y-shaped teeth $e$ $e$ $e$ $e$ and from thence it is conveyed through the passage H. The circular concavities $c$ $c$ $c$ $c$ are arranged in close proximity to each other on a circle described fom the axis of the disks; the adjacent concavities are arranged in radial lines from the axis to the periphery, and thus, those around the outer edge of the disk are at a greater distance apart than those nearest the center. This arrangement insures the speedy distribution, and conveys the grain to the points of discharge, with a regularity unequaled by any arrangement heretofore known; and the interception of the discharges by the V-shaped grinders $e$ $e$ retain the flour only a sufficient length of time to give it a regularity and evenness in its character which is desirable. These disks possess the additional advantage of being revolved both ways; and when the disks or teeth are worn on one side, they can be revolved in the opposite direction.

This mill has been thoroughly tested and its efficiency in operation, cheapness in construction and facility in discharging renders it an important desideratum for the farmer and others engaged in milling.

I claim—

1. The employment of a system of circular grinding teeth when arranged in the manner and for the purposes above set forth.

2. I also claim arranging around the outer surface of the disk intercepting V-shaped teeth, to operate in the manner and for the purposes herein specified.

OTIS W. STANFORD.

Witnesses:
TRUMAN CONKLIN,
DANIEL CONKLIN.